United States Patent
Xiao et al.

(10) Patent No.: US 9,596,599 B2
(45) Date of Patent: Mar. 14, 2017

(54) AUTHENTICATION FOR SECURE WIRELESS COMMUNICATION

(75) Inventors: Liang Xiao, Piscataway, NJ (US); Chunxuan Ye, Wayne, PA (US); Suhas Mathur, Edison, NJ (US); Yogendra C Shah, Exton, PA (US); Alexander Reznik, Titusville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 379 days.

(21) Appl. No.: 13/121,190

(22) PCT Filed: Sep. 18, 2009

(86) PCT No.: PCT/US2009/057477
§ 371 (c)(1),
(2), (4) Date: Dec. 16, 2013

(87) PCT Pub. No.: WO2010/033802
PCT Pub. Date: Mar. 25, 2010

(65) Prior Publication Data
US 2014/0173682 A1   Jun. 19, 2014

Related U.S. Application Data

(60) Provisional application No. 61/098,480, filed on Sep. 19, 2008.

(51) Int. Cl.
*H04W 12/06* (2009.01)
*H04L 9/32* (2006.01)

(52) U.S. Cl.
CPC ........... *H04W 12/06* (2013.01); *H04L 9/3236* (2013.01); *H04L 2209/38* (2013.01); *H04L 2209/805* (2013.01)

(58) Field of Classification Search
CPC ............... H04W 12/06; H04L 9/3236; H04L 2209/805; H04L 2209/38
(Continued)

(56) References Cited

U.S. PATENT DOCUMENTS 5,943,615 A * 8/1999 Rose et al. .................... 455/411
6,498,864 B1 * 12/2002 Roseman et al. ............. 382/207
(Continued)

FOREIGN PATENT DOCUMENTS

| CN | 1747382 | 3/2006 |
|---|---|---|
| WO | WO 03069799 A2 * | 8/2003 |
| WO | WO 2005/043805 A1 | 5/2005 |

OTHER PUBLICATIONS

Wenjing et al., Indoor Fingerprinting Geolocation using Wavelet-Based Features Extracted from the Channel Impulse Response in Conjunction with an Artificial Neural Network, Nov. 2007, IEEE International Symposium on Industrial Electronics, pp. 2028-2032.*
(Continued)

*Primary Examiner* — Kenneth Chang
(74) *Attorney, Agent, or Firm* — Baker & Hostetler LLP

(57) ABSTRACT

A method and apparatus for use in authentication for secure wireless communication is provided. A received signal is physically authenticated and higher layer processed. Physical authentication includes performing hypothesis testing using a channel impulse response (CIR) measurement of the received signal and predetermined referenced data. Higher layer processing includes validating the signal using a one-way hash chain value in the signal. Once a signal is authenticated, secure wireless communication is performed.

19 Claims, 5 Drawing Sheets

(58) Field of Classification Search
USPC .......................................................... 726/1
See application file for complete search history.

(56) References Cited

U.S. PATENT DOCUMENTS

| | | | |
|---|---|---|---|
| 6,615,040 B1* | 9/2003 | Benveniste | 455/423 |
| 2002/0029341 A1* | 3/2002 | Juels et al. | 713/184 |
| 2003/0108009 A1* | 6/2003 | Petersen | 370/332 |
| 2004/0199670 A1* | 10/2004 | Garfinkel | 709/246 |
| 2005/0091545 A1* | 4/2005 | Soppera | 713/202 |
| 2005/0113070 A1* | 5/2005 | Okabe | 455/411 |
| 2006/0136728 A1* | 6/2006 | Gentry | H04L 9/3242 |
| | | | 713/176 |
| 2006/0176824 A1* | 8/2006 | Laver et al. | 370/241 |
| 2006/0212704 A1 | 9/2006 | Kirovski et al. | |
| 2007/0036353 A1* | 2/2007 | Reznik | H04B 7/0434 |
| | | | 380/30 |
| 2007/0058745 A1* | 3/2007 | Watanabe | H04L 25/03171 |
| | | | 375/264 |
| 2007/0058808 A1* | 3/2007 | Rudolf | H04L 9/0841 |
| | | | 380/44 |
| 2007/0136587 A1* | 6/2007 | Shvodian et al. | 713/169 |
| 2007/0230580 A1* | 10/2007 | Kim | H04L 25/0212 |
| | | | 375/240.18 |
| 2008/0125043 A1* | 5/2008 | Karmanenko | H04W 12/10 |
| | | | 455/41.2 |
| 2008/0235509 A1* | 9/2008 | Laberteaux | H04L 9/006 |
| | | | 713/156 |
| 2008/0295144 A1* | 11/2008 | Cam-Winget et al. | 726/1 |
| 2010/0246825 A1* | 9/2010 | Baras | H04L 9/32 |
| | | | 380/270 |

OTHER PUBLICATIONS

PCT Application No. PCT/US2009/057477 : International Preliminary Report on Patentability and Written Opinion, Mar. 22, 2011, 6 pages.

Perrig et al., "The TESLA Broadcast Authentication Protocol", RSA Laboratories Cryptobytes, Jun. 30, 2006, 5, 1-11.

* cited by examiner

AUTHENTICATION FOR SECURE WIRELESS COMMUNICATION

CROSS-REFERENCE TO RELATED APPLICATIONS

This application is the National Stage of PCT Application No. PCT/US2009/057477, filed Sep. 18, 2008, which claims the benefit of U.S. Provisional Application No. 61/098,480, filed Sep. 19, 2008, the disclosures of which are incorporated herein by reference in their entirety.

FIELD OF INVENTION

This application is related to wireless communications.

BACKGROUND

In typical wireless communications two wireless transmit/receive units (WTRUs), Alice and Bob, communicate with each other on a channel. To exclude an illegitimate entity, Eve, Alice and Bob cryptographically protect their communications. Traditional cryptographic techniques, which rely on computational difficulty, are increasingly ineffective as the availability of computing power increases. In addition, an Eve may use a spoofing to disrupt legitimate communications in variety of ways, such as through denial of service or signals by impersonating a legitimate communicating entity.

Information-theoretically secure cryptographic techniques eliminate the reliance on computational difficulty. For example, Alice and Bob may employ the reciprocity of a wireless channel to extract secret keys. These techniques usually rely on exchanging signals, or probing, the wireless channel, such as in a time division duplex (TDD) manner, to collect correlated information from which common secret bits are obtained. During the probing, it may be difficult for Alice and Bob to be sure that the signals they received originated from a legitimate source. Thus a method an apparatus for providing authentication for secure wireless communication would be advantageous.

SUMMARY

A method and apparatus for use in authentication for secure wireless communication is provided. A received signal is physically authenticated and higher layer processed. Physical authentication includes performing hypothesis testing using a channel impulse response (CIR) measurement of the received signal and predetermined referenced data. Higher layer processing includes validating the signal using a one-way hash chain value in the signal. Once a signal is authenticated, secure wireless communication may be performed.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. The terms "WTRU" and "base station" are not mutually exclusive. For example, a WTRU may be an enhanced Home Node-B (H(e)NB).

When referred to hereafter, the term "Alice" includes a WTRU or a base station that is a legitimate communicating entity. When referred to hereafter, the term "Bob" includes a WTRU or a base station that is a legitimate communicating entity. When referred to hereafter, the term "information-theoretically secure" includes but is not limited to perfectly secure, unconditionally secure, and nearly information-theoretically secure. When referred to hereafter, the terms "trust", "trusted", and "trustworthy", as well as variations thereof, indicate a quantifiable and observable manner of assessing whether a unit will function in a particular manner.

Figure 1:
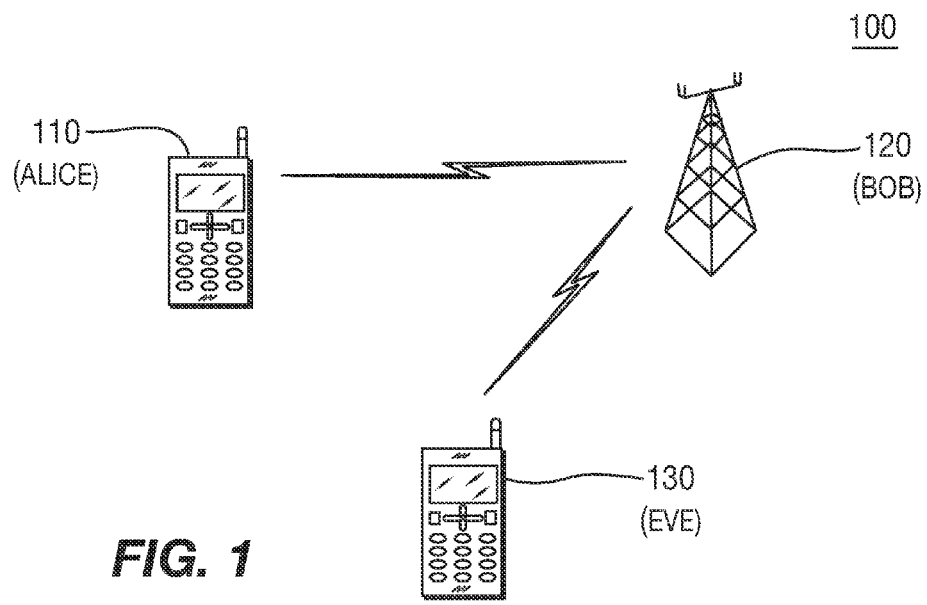
FIG. 1 shows a block diagram of an example of a network for performing authentication for secure wireless communication.

FIG. 1 shows a block diagram of an example of a wireless communication network 100 for performing authentication for secure wireless communication. The network 100 includes a first WTRU 110 (Alice), a base station 120 (Bob), and an illegitimate communicating entity 130 (Eve). Alice is in communication Bob. Eve is attempting to interfere.

Although shown as a WTRU for simplicity, Alice may be a base station, or any other apparatus capable of performing wireless communication. Although shown as a base station for simplicity, Bob may be a WTRU, or any other apparatus capable of performing wireless communication. In addition, it should be apparent that any combination of wireless and wired devices may be included in the wireless communication network 100.

Figure 2:
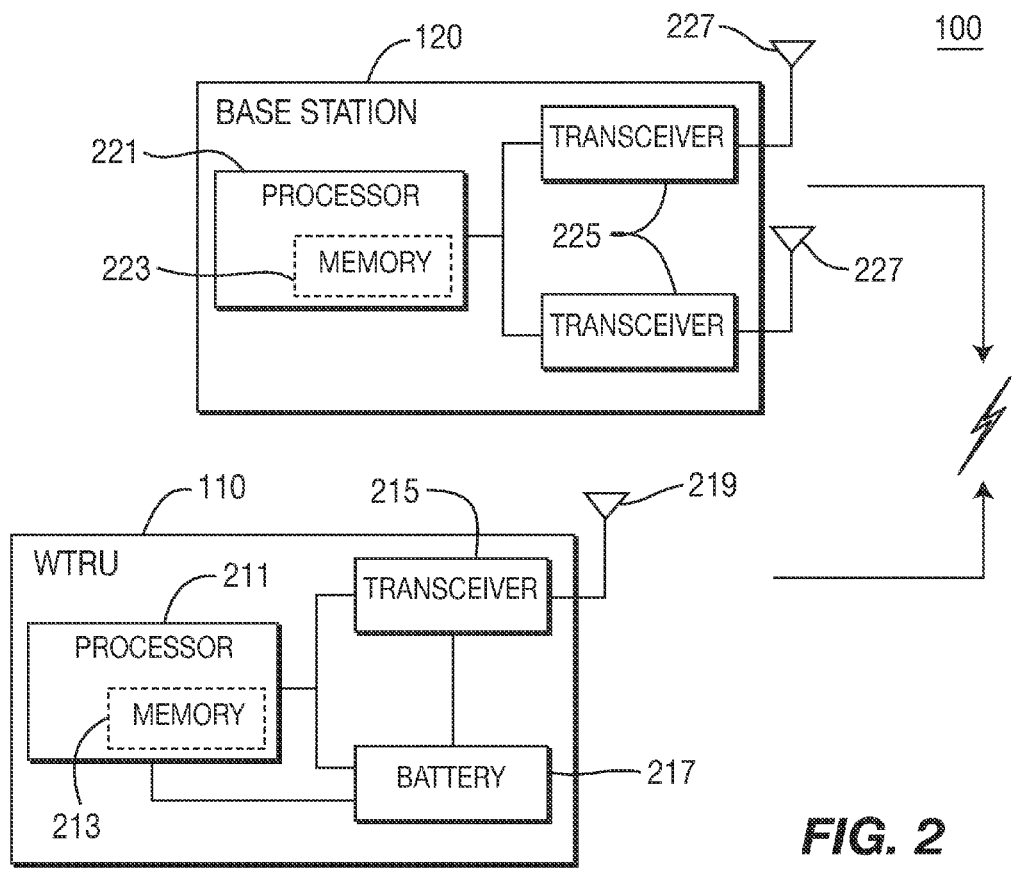
FIG. 2 shows a block diagram of an example of a wireless transmit/receive unit and a base station for performing authentication for secure wireless communication.

FIG. 2 is a more detailed block diagram of an example of the wireless communication network 100 including Alice, shown as a WTRU 110, and BOB, shown as a base station 120. As shown Alice and Bob are configured to perform a method of authentication for secure wireless communication.

In addition to the components that may be found in a typical WTRU, the WTRU 110 includes a processor 211 with an optional linked memory 213, at least one transceiver 215, an optional battery 217, and an antenna 219. The processor 211 is configured to perform a method of authentication for secure wireless communication. The transceiver 215 is in communication with the processor 211 and the antenna 219 to facilitate the transmission and reception of wireless communications. In case a battery 217 is used in the WTRU 110, it powers the transceiver 215 and the processor 211.

In addition to the components that may be found in a typical base station, the base station 120 includes a processor 221 with an optional linked memory 223, transceivers 225, and antennas 227. The processor 221 is configured to perform a method of authentication for secure wireless communication. The transceivers 225 are in communication with the processor 221 and antennas 227 to facilitate the transmission and reception of wireless communications.

In a typical rich scattering environment, the radio channel response decorrelates rapidly in space. A physical-layer, channel-based, method that combines channel probing, M complex frequency response samples over a bandwidth W, with hypothesis testing may be used to determine whether current and prior communication attempts are made by the same communicating entity. In this way, legitimate entities can be authenticated and illegitimate entities can be detected.

In response to a spoofing attack, the receiver may fail to detect a certain percentage of illegitimate signals, called the miss rate, and accept the spoofed messages as valid. Once an attack is missed, the receiver may generate a certain percentage of false rejections, called the false alarm rate, when the legitimate communicating entity attempts to authenticate. To counteract the non-zero probabilities of false alarm and missed detection, and the possibility of decorrelation due to missed or lost signals, a one-way hash chain that relies on purely cryptographic properties of hash functions and provides cryptographic protections based on the computational difficulty of inverting a one-way function, F(.), may be combined with the channel-based method.

Figure 3:
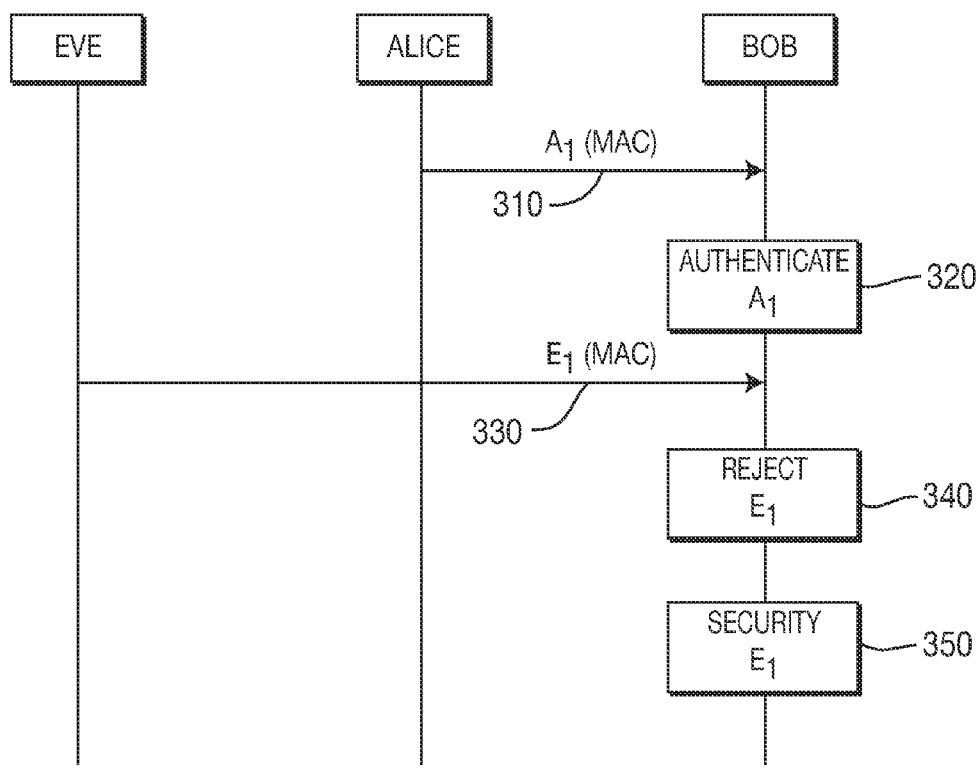
FIG. 3 shows a diagram of an example of a method of authentication for secure wireless communication.

FIG. 3 is a flow diagram of an example of a method of authentication for secure wireless communication. Alice sends a signal $A_1$ including a unique identifier, such as a medium access control (MAC) address, to Bob to establish a connection at 310. Bob receives the signal $A_1$ and uses a double-authentication algorithm, which includes channel-based validation and purely cryptographic validation, to authenticate the signal at 320. Eve attempts a spoofing attack to gain illegitimate access by sending a spoofing signal $E_1$ including Alice's MAC address to Bob at 330. Bob receives Eve's spoofing signal $E_1$ and detects Eve's spoofing attack using the double-authentication algorithm at 340. In response to detecting Eve's spoofing attack, Bob performs a security algorithm, for example a system-dependent method, at 350.

Figure 4:
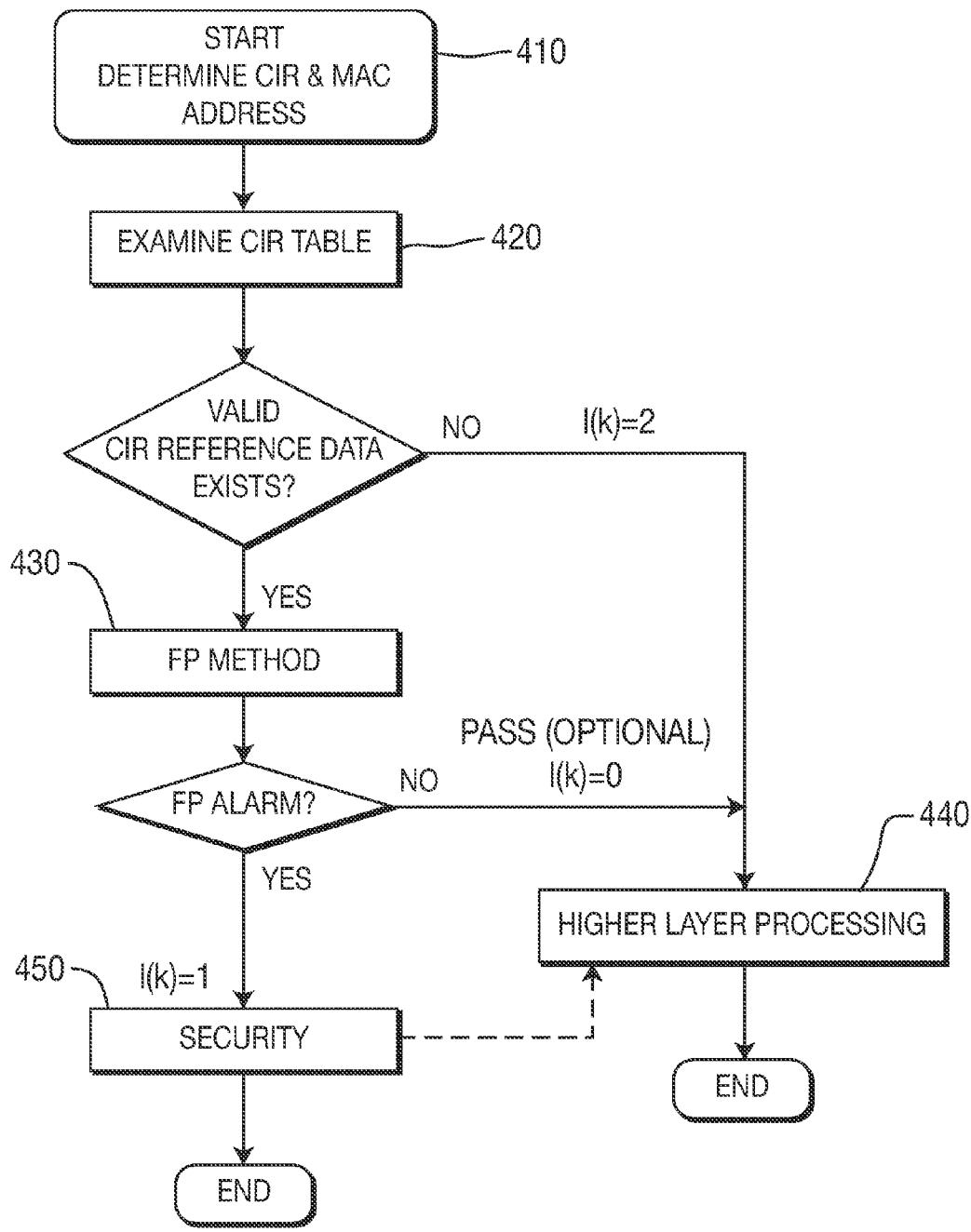
FIG. 4 is a flow chart of an example of a method of double-authentication.

FIG. 4 is a flow chart of an example of a method of double-authentication. Bob receives a signal including a unique identifier (MAC address) and generates a channel impulse response (CIR) measurement based on the received signal at 410. Bob examines a reference table to determine whether valid reference CIR data associated with the MAC address exists at 420. If the CIR reference data exists, Bob performs a Fingerprints in the Ether (FP) method at 430. For example, a typical FP method includes the configuration of a storage mechanism for recording the shape of a CIR measurement associated with a particular WTRU, such as, via a MAC address. Upon receipt of a signal purporting to have originated from the WTRU, the receiver obtains a CIR measurement for the signal and compares it with the recorded CIR. If the two CIRs match, the signal is interpreted as being authentic.

If the FP method does not detect a possible attack (I(k)=0), or if no CIR reference data exists (I(k)=2), Bob performs higher layer processing, such as MAC layer authentication, at 440. Optionally, the higher lay processing may be nominal, such that $I_2(k)=0$, or may be omitted. If the CIR reference data is authenticated, it is recorded in the reference table.

A CIR measurement may become stale over time. For example, after a period equal to the channel coherence time has passed, a CIR may completely decorrelate. The use of stale channel data may lead to false alarms. Accordingly, the CIR reference table includes a timer for each CIR record. When the timer reaches the maximum lifetime, $N_T$, the CIR record expires and, optionally, is deleted. The maximum lifetime of the CIR record, $N_T$, is set such that each CIR record expires within the relevant channel coherence time.

Referring back to FIG. 4, the FP method at 430 uses CIR data and hypothesis testing to differentiate among transmitters and detect spoofing messages. Hypothesis testing includes performing a test statistic function which provides a metric that is compared with a test threshold to produce hypothesis results. A test statistic function, $L(H_0, H_1)$, is calculated to evaluate the difference between the input CIR data, $H_1$, and the reference CIR data, $H_0$. The result of the test statistic function is compared with a test threshold, Thre. If $H_0$ and $H_1$ are not similar enough $L(H_0, H_1)$>Thre and the FP method reports an alarm. Where I(k) indicates the result of the FP method at time k, the FP method may be expressed as:

$$I(k) = \begin{cases} 0, & L(H_1(k), H_0(k)) < Thre \\ 1, & L(H_1(k), H_0(k)) \geq Thre \\ 2, & No\ H_0(k). \end{cases} \quad \text{Equation (1)}$$

The test statistic function approximately represents a generalized likelihood ratio test based on a time-invariant channel model. The channel parameters, such as channel coherence time, may vary significantly over time, and may depend on environment changes. It should be apparent that other functions may be implemented depending on the particular channel model without exceeding the scope of the present application. Table 1 shows several exemplary applications of the test statistic function.

TABLE 1

| No | Test statistic, $L(H_0, H_1)$ | $H_0$ & $H_1$ |
|----|-------------------------------|---------------|
| 1 | $\|H_1 - H_0 e^{jArg(H_0^H H_1)}\|^2$ | CIR vectors obtained at time k − 1 and k |
| 2 | $\|H_1 - H_0 e^{jArg(H_0^H H_1)}\|^2 / \min(\|H_1\|^2, \|H_0\|^2)$ | |
| 3 | $\|H_1 - H_0 e^{jArg(H_0^H H_1)}\|^2$ | CIR vectors (Fourier transform of CIR) obtained at time k − 1 and k |
| 4 | $\|H_1 - H_0 e^{jArg(H_0^H H_1)}\|^2 / \min(\|H_1\|^2, \|H_0\|^2)$ | |
| 5 | $\|H_1 - H_0 e^{jArg(H_0^H H_1)}\|^2$ | CPP of CIR vectors obtained at time k − 1 and k |
| 6 | | Same as L5, except exclusion of power normalization in CPP |
| 7 | $\|H_1 - H_0\|^2$ | CPP of CIR vectors obtained at time k − 1 and k |
| 8 | $\|H_1 - H_0 e^{jArg(H_0^H H_1)}\|^2$ | CPP of CIR vectors obtained at time k − 1 and k, and then do Fourier transform |

As shown in Table 1, the test statistics, L1, L3, and L5, process CIR data in the time domain, while their counterparts, L2, L4, and L8, process the channel frequency responses. In addition, L1-L6 and L8 utilize a complex scalar, $e^{jArg(H_0^H H_1)}$, to counteract the phase drifting of the channel response due to the changes of the receiver's local oscillator.

A CIR Post-Process (CPP) method may be used to align the channel impulse response in the time domain where two CIR vectors shift in time to increase the overlap in shape. The CPP method may reduce the affect of timing errors in channel estimation, and may reduce the false alarm rate. To support time shifting, the CPP method may optionally include, for example, CIR shape pruning, up sampling, and normalization of power.

The threshold, Thre, may be a pre-assigned threshold. For example, a fixed threshold based on empirical data may be used. Alternatively, an adaptive threshold may be used. To establish an adaptive threshold, Alice sends $N_{train}$ training messages to Bob, so as to teach Bob the range of the test statistics. Bob determines a percentile value of the test statistic as the test threshold. For example, Bob may select a low threshold for a channel that exhibits low time variation in order to balance between a false alarm rate and miss rate.

Referring again to FIG. 4, if the FP algorithm detects a possible attack (I(k)=1), such as a spoofing attack, and reports an alarm, Bob executes a security policy at 450. In some embodiments, Bob simply discards the signal without performing higher layer processing. Alternatively, Bob performs higher layer processing to further evaluate the authenticity of the received signal. If the signal also fails the higher layer processing, it is then discarded. For example, Bob may perform a one-way hash chain to further evaluate the authenticity of the received signal.

Figure 5:
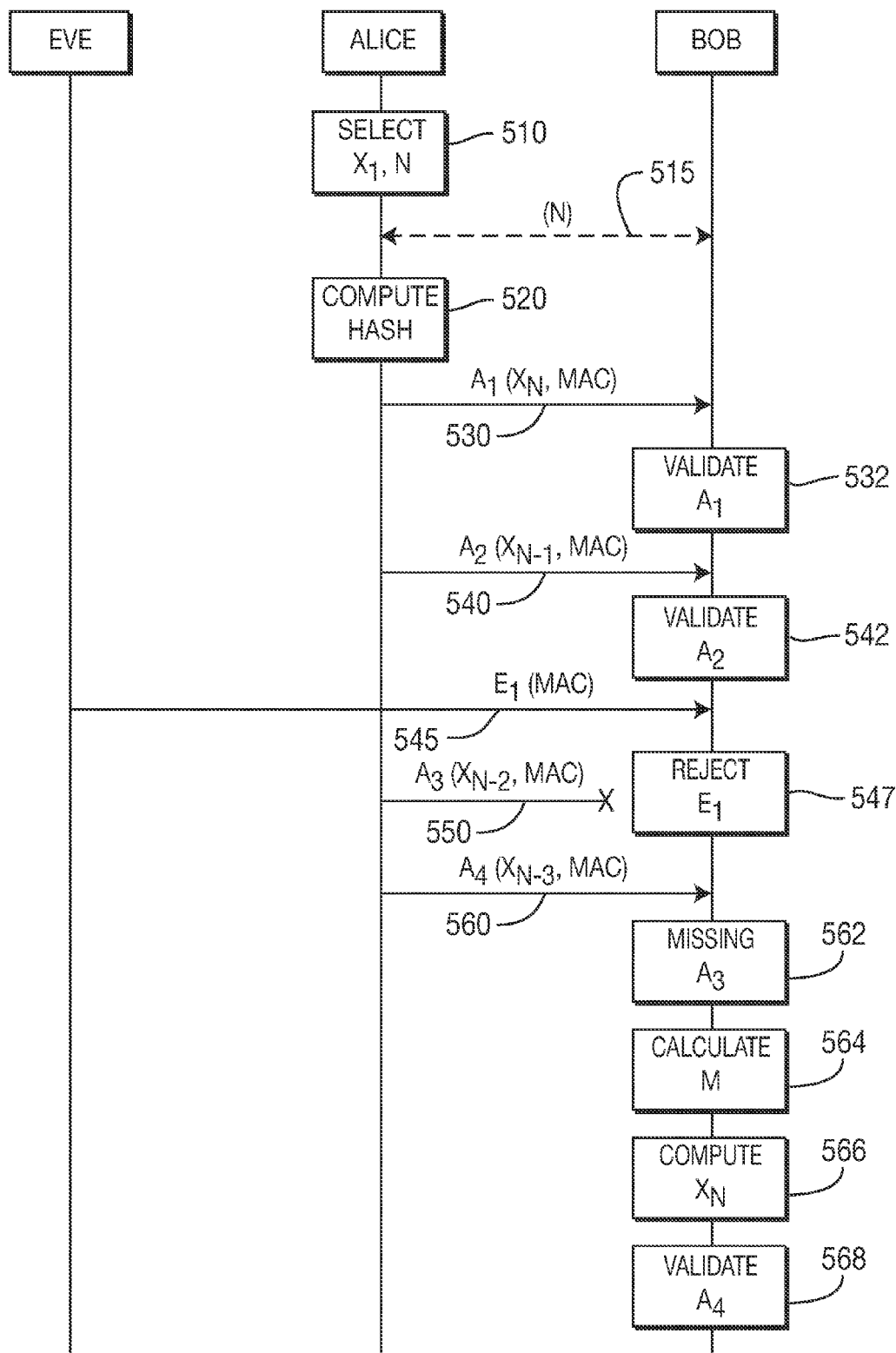
FIG. 5 shows a diagram of an example a method of double-authentication using one-way hash chain based higher layer processing.

FIG. 5 is a diagram of an example method of double-authentication using one-way hash chain based higher layer processing. In this embodiment, each signal Alice sends includes an element from a one-way hash chain. A one-way hash chain includes a sequence of elements based on a publicly known one-way hash function F(.), such that, using knowledge of $X_i$, $X_j$ may be computed for all j>i, In addition, it is computationally difficult to compute $F(X_k)$ for any k<i.

Where the integer N denotes a predetermined number of signals, the one-way hash chain may be expressed as:

$$X_1 \to X_2 = F(X_1) \to X_3 = F(X_2) \to \ldots \to X_N = F(X_{N-1}). \quad \text{Equation (2)}$$

As shown in FIG. 5, Alice chooses a random seed $X_1$ and a value of N at 510. The value of N is based on Alice's estimate of the total number of probes she expects to transmit. Alice and Bob agree on the rate at which the signals will be sent at 515. For example, Alice estimates N and sends a message to Bob indicated N. Alternatively, Alice and Bob may agree on a value of N in a prior communication. Optionally, Alice's choice of N may be configured as a protocol parameter. It should be apparent that any method of agreeing on the value of N may be performed without exceeding the scope of the application.

Alice successively computes and stores N hash function values based on $X_1$ at 520. For example, the hash of $X_1$ may be expressed as $X_2 = F(X_1)$, and the hash of $X_2$ may be expressed as $X_3 = F(F(X_1))$. Optionally, the one-way hash chain may be pre-computed and stored.

Alice transmits a series of N signals including her MAC address and the calculated hash values to Bob beginning at 530. For example, Alice includes the element $X_N$ in the first signal $A_1$ at 530, the element $X_{N-1}$ in the second signal $A_2$ at 540, and so on at 560-570. Thus the elements of the chain are revealed in reverse order. Bob receives the first signal $A_1$ and the second signal $A_2$ and validates them at 532, 542 using the FP method.

Eve attempts to spoof Alice by sending a signal $E_1$ including Alice's MAC address to Bob at 545. Anyone receiving the signals may compute the hash of the element contained in a signal using the publicly known function F(.) to verify that it equals the element contained in the previous signal, thereby being confident that the signal was sent by the same entity that transmitted the previous signal. Moreover, since the hash function F(.) is one-way, knowledge of hash elements contained in received signals, $t=t_0$, cannot be used to predict the hash elements contained in later received signals, such as signals arriving at $t>t_0$. Therefore, Bob receives Eve's signal $E_1$, computes the hash value, and determines that CIR and hash values do not match, and rejects Eve's spoofing attempt at 547.

Alice transmits a third signal $A_3$ containing the one-way hash chain element $X_{N-2}$ at 550. However, Bob does not receive the third signal. Alice transmits a fourth signal $A_4$, containing the one-way hash chain element $X_{N-3}$, at 560. Bob receives the fourth signal $A_4$ and recognizes that a signal has been missed at 562.

If a signal is lost, the legitimacy of the next received signal may be ascertained by recursively computing the hash of the element in the latest received signal. Thus, at 564, Bob determines the number of missed signals, m, based on the rate at which he and Alice have agreed to send signals on the channel. Bob computes the hash $F(F(F \ldots F(X_n))) \ldots )$ where $X_n$ is the hash element in the latest signal, and the hash function is applied m times at 566. Bob compares the new hash value with the hash value contained in the previous correctly received signal $A_2$, and validates the signal $A_4$ at 568.

Authentication based on one-way hash chains does not depend upon the wireless channel and does not reveal any part of any secret keys derived between Alice and Bob. For example, if Alice and Bob derive secret encryption keys based on common randomness of a wireless channel, these keys are not publicly revealed during one-way hash chain authentication and are preserved for use during encryption. Since the number of signals that need to be exchanged in order to extract a key of a certain length may be conservatively upper bounded by a constant number N, a constant amount of memory is used to store the one-way hash chain.

Optionally, to protect against a simple substitution attack, wherein Eve reads the hash element from a signal and uses those numbers to spoof a signal, a Message Authentication Code of each signal including the preamble bits, the hash element disclosed, and a sequence number, may be attached at the end of the signal. The Message Authentication Code is computed using the next hash element to be revealed in the next signal as a key.

In some embodiments, the one-way hash chain is extended to protect further signals by cascading a second one-way hash chain after the first. Elements from the start of the second chain are included with elements from the end of the first chain. This effectively authenticates the start of the second chain before the first chain has ended.

It should be apparent that the combination of channel-based and one-way chain based data-origin consistency may be used in a number of ways, by attributing an appropriate amount of importance to the outcome of the hypothesis test computed for each received probe. For example, one-way chain authentication or channel-based authentication may be performed for a subset of the messages.

Regardless of the higher layer processing method used, the result may be denoted $I_2(k)=0$ if Alice is authenticated, and $I_2(k)=1$ if a possible attack is detected. Thus, the overall authentication determination $I_a(k)$, may be expressed as:

$$I_a(k) = \begin{cases} 1, & \text{if } I(k) = 1 \\ I_2(k), & \text{else.} \end{cases} \qquad \text{Equation (3)}$$

Where $H_1(k)$ is the CIR derived from a signal received at time k, $H_0(k)$ may be expressed as:

$$H_0(k) = \begin{cases} H_1(k-1), & \text{if } I_a(k-1) = 0 \\ H_0(k-1), & \text{else if Timer of } H_0(k-1) \leq N_T \\ NA, & o.w.. \end{cases} \qquad \text{Equation (4)}$$

Where Bob has a reliable reference channel response, resulting from a message sent by Alice for which the timer has not expired, the source of the CIR vector H may be designated S(H). For example, $S(H_0(k))$=Alice and $I(k)<2$. The false alarm rate, $P_{fa}$, and miss rate, $P_m$, may be denoted as:

$$P_{fa}=P\{I(k)=1|S(H_1(k))=S(H_0(k))\}$$

$$P_m=P\{I(k)=0|S(H_1(k))\neq S(H_0(k))\}. \qquad \text{Equation (5)}$$

Where Bob does not have a reliable reference channel response the false alarm rate, $P_{FA}$, and miss rate, $P_M$, may be denoted as:

$$P_{FA}=P\{I(k)=1|S(H_1(k))=\text{Alice}\}$$

$$P_M=P\{I(k)\neq 1|S(H_1(k))=\text{Eve}\}. \qquad \text{Equation (6)}$$

Where $P_{fa2}$ and $P_{m2}$ denote the false alarm rate and the miss rate of the higher layer processing respectively, the overall false alarm rate, $P_{FAA}$, may be denoted as:

$$P_{MA}=P_M P_{m2}$$

$$P_{FAA}=P_{FA}+(1-P_{FA})P_{fa2}. \qquad \text{Equation (7)}$$

The performance of the overall false alarm rate depends more on $P_{FA}$ and $P_M$, than $P_{fa}$, and $P_m$; however, the evaluation of $P_{FA}$ and $P_M$, takes more effort due to the dependence on the timer limit, $N_T$, higher layer processing, and transmission pattern of both Alice and Eve. For example, if Eve sends spoofing messages more frequently, both $P_{FA}$ and $P_M$ increase, even though everything else including $P_{fa}$, and $P_m$ remains relatively constant. Since the generalized closed-form expressions of $P_{FA}$ and $P_M$ are hard to obtain, they may be bound as functions of $P_{fa}$, and $P_m$, which are much easier to evaluate.

For example, if Bob receives one signal from either Alice, $P_a$, or Eve, $P_e$, every time unit, and the source of the message is time independent, the identically distributed signals may be expressed as:

$$P = \begin{cases} P_a, & S(H_1(k)) = \text{Alice} \\ 1 - P_a, & S(H_1(k)) = \text{Eve.} \end{cases} \qquad \text{Equation (8)}$$

Where the CIR timer $N_T$ is less than the channel coherence time, and the correlation of any two CIR vectors of the same channel is constant within the channel coherence time, the lower-bound of the overall false alarm rate and miss rate the FP method may be expressed as:

$$P_{FA}=P_{fa}-P_{fa}(1-P_a+P_a P_{FA})^{N_T}$$

$$P_M=P_m+(1-P_m)(1-P_a(1-P_{FA}))^{N_T}. \qquad \text{Equation (9)}$$

Figure 6:
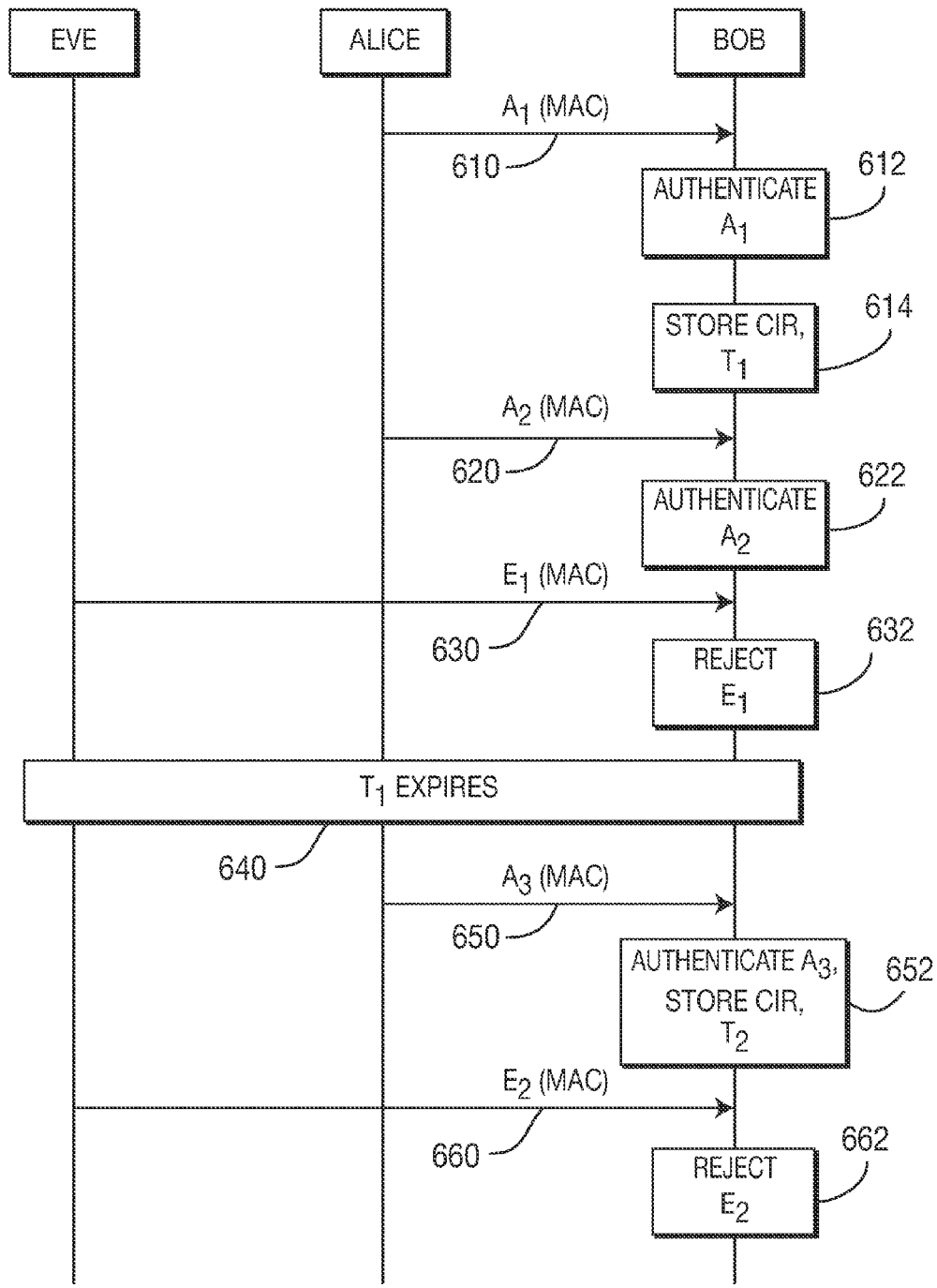
FIG. 6 shows a block diagram of an example of a method of authentication for secure wireless communication with re-authentication.

FIG. 6 shows a block diagram of an example of a method of authentication for secure wireless communication with re-authentication. Alice sends a first signal $A_1$ to Bob at 610. Bob receives the signal $A_1$ and authenticates it using higher layer processing at 612. Bob stores Alice's CIR reference data, including a timer $T_1$ at 614.

Alice sends a second signal $A_2$ to Bob at 620. Bob receives the signal $A_2$, generates a CIR measurement based on the received signal, locates the stored CIR reference data, performs the FP method, and authenticates Alice at 622.

Eve attempts to gain illegitimate access using a spoofed signal $E_1$ including Alice's MAC address at 630. Bob receives Eve's signal $E_1$, generates a CIR measurement based on the received signal, locates the stored CIR reference data, and detects the spoofed signal at 632.

The timer $T_1$ expires at 640. Alice sends a third signal $A_3$ to Bob at 650. Bob receives the signal $A_3$, generates a CIR measurement based on the received signal, looks for, but does not locates stored CIR reference data, authenticates the signal $A_3$ using higher layer processing, and stores Alice's CIR reference data, including a timer $T_2$ at 652. For example, Bob may authenticate the signal A3 using the one-way hash chain method described in reference to FIG. 6.

Eve attempts to gain illegitimate access using a spoofed signal $E_2$ including Alice's MAC address at 660. Bob receives Eve's signal $E_2$, generates a CIR measurement based on the received signal, locates the stored CIR reference data, and detects the spoofed signal at 662.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Embodiments

1. A method for use in wireless communication, the method comprising:
receiving a signal from a wireless transmit/receive unit (WTRU); and
authenticating the received signal.

2. A method as in any one of the preceding embodiments wherein the authenticating includes double-authentication.

3. A method as in any one of the preceding embodiments wherein the authenticating includes physically authenticating the received signal.

4. A method as in any one of the preceding embodiments wherein the authenticating includes higher layer processing the received signal.

5. A method as in any one of the preceding embodiments wherein the physically authenticating includes fingerprints in the ether (FP) authenticating the signal.

6. A method as in any one of the preceding embodiments wherein the physically authenticating includes determining whether a predetermined physical attribute is available based on data included in the signal.

7. A method as in any one of the preceding embodiments wherein the physically authenticating includes determining whether a physical attribute of the received signal matches a predetermined physical attribute associated with data included in the received signal.

8. A method as in any one of the preceding embodiments wherein the physically authenticating includes evaluating a channel impulse response (CIR) measurement of the received signal.

9. A method as in any one of the preceding embodiments wherein the evaluating a CIR measurement includes comparing a shape of a CIR measurement of the received signal with a shape of a predetermined CIR measurement associated with data included in the received signal.

10. A method as in any one of the preceding embodiments wherein the authenticating the received signal includes storing a physical attribute of the received signal in association with data included in the received signal.

11. A method as in any one of the preceding embodiments wherein the storing a physical attribute includes storing a timer.

12. A method as in any one of the preceding embodiments wherein the physically authenticating includes ignoring information associated with an expired timer.

13. A method as in any one of the preceding embodiments further comprising:
executing a security policy in response to an authentication failure.

14. A method as in any one of the preceding embodiments wherein the physically authenticating includes hypothesis testing.

15. A method as in any one of the preceding embodiments wherein the hypothesis testing includes calculating a hypothesis result using a test statistic function.

16. A method as in any one of the preceding embodiments wherein the hypothesis testing includes comparing the hypothesis result with a threshold.

17. A method as in any one of the preceding embodiments wherein the hypothesis testing includes adaptively determining the threshold.

18. A method as in any one of the preceding embodiments wherein the adaptively determining includes receiving a signal indicating a threshold from the WTRU.

19. A method as in any one of the preceding embodiments wherein the higher layer processing includes purely cryptographic validation.

20. A method as in any one of the preceding embodiments wherein the higher layer processing includes one-way hash chain authentication.

21. A method as in any one of the preceding embodiments wherein the one-way hash chain authentication includes extracting a Message Authentication Code from each signal in a plurality of signals.

22. A method as in any one of the preceding embodiments wherein the message authentication code includes a preamble bit.

23. A method as in any one of the preceding embodiments wherein the message authentication code includes a one-way hash chain element.

24. A method as in any one of the preceding embodiments wherein the message authentication code includes a sequence number.

25. A method as in any one of the preceding embodiments wherein the receiving a signal includes receiving a plurality of signals.

26. A method as in any one of the preceding embodiments wherein each signal in the plurality of received signals includes an element of a one-way hash chain.

27. A method as in any one of the preceding embodiments wherein the higher layer processing includes determining whether a hash value of a first one-way hash chain element in a first signal in the plurality of signals matches a second one-way hash chain element in a second signal in the plurality of signals.

28. A method as in any one of the preceding embodiments further comprising:
receiving a signal indicating a signal count for the plurality of signals.

29. A method as in any one of the preceding embodiments further comprising:
receiving a signal indicating a transmission rate for the plurality of signals.

30. A method as in any one of the preceding embodiments the determining includes recursively computing a missing hash value using the first one-way hash chain element and the second one-way hash chain element.

31. A method as in any one of the preceding embodiments wherein the higher layer processing includes determining whether a hash value of a third one-way hash chain element in a third signal in the plurality of signals matches a fourth one-way hash chain element in the second signal in the plurality of signals.

32. A method as in any one of the preceding embodiments further comprising:
performing secure wireless communication with the WTRU.

33. A method as in any one of the preceding embodiments wherein the authenticating includes channel-based validation.

34. A method as in any one of the preceding embodiments wherein the authenticating includes rejecting a spoofing attack.

35. A method as in any one of the preceding embodiments wherein the signal includes information that indicates an identity of the WTRU.

36. A method as in any one of the preceding embodiments wherein the test statistic function represents a generalized likelihood ratio test.

37. A method as in any one of the preceding embodiments wherein the likelihood ratio test is based on a time-invariant channel model.

38. A method as in any one of the preceding embodiments wherein the test statistic function depends on a channel model.

39. A method as in any one of the preceding embodiments wherein the test statistic function includes processing CIR data in the time domain.

40. A method as in any one of the preceding embodiments wherein the test statistic function includes processing a channel frequency response.

41. A method as in any one of the preceding embodiments wherein the test statistic function includes using a complex scalar to counteract phase drift.

42. A method as in any one of the preceding embodiments wherein measuring a CIR includes performing CIR post-processing.

43. A method as in any one of the preceding embodiments wherein the CIR post-processing includes aligning the CIR measurement.

44. A method as in any one of the preceding embodiments wherein the CIR post-processing includes CIR shape pruning 45. A method as in any one of the preceding embodiments wherein the CIR post-processing includes up sampling.

46. A method as in any one of the preceding embodiments wherein the CIR post-processing includes normalization of power.

47. A method as in any one of the preceding embodiments wherein the threshold is pre-assigned.

48. A method as in any one of the preceding embodiments wherein the threshold is based on empirical data.

49. A method as in any one of the preceding embodiments wherein the threshold is adaptively assigned.

50. A method as in any one of the preceding embodiments wherein the adaptively assigning includes receiving a training message from the WTRU.

51. A method as in any one of the preceding embodiments wherein the receiving a training message includes determining a range of test statistics.

52. A wireless transmit/receive unit (WTRU) configured to perform at least part of any one of the preceding embodiments.

53. A base station configured to perform at least part of any one of the preceding embodiments.

54. An integrated circuit configured to perform at least part of any one of the preceding embodiments.

What is claimed is:

1. A method for use in wireless communication, the method comprising:
   receiving a signal from a wireless transmit/receive unit (WTRU); and authenticating the received signal by:
   checking for a valid predetermined CIR measurement and if the valid predetermined CIR measurement exists, physically authenticating the received signal, wherein the physically authenticating includes evaluating a channel impulse response (CIR) measurement of the received signal by comparing a shape of the CIR measurement with a shape of the valid predetermined CIR measurement, and
   if the shape of the CIR measurement matches the shape of the predetermined CIR measurement, higher layer processing the received signal.

2. The method of claim 1, wherein the physically authenticating includes:
   determining whether a predetermined physical attribute is available based on data included in the signal; and
   determining whether a physical attribute of the received signal matches the predetermined physical attribute, on a condition that the predetermined physical attribute is available.

3. The method of claim 1, wherein the authenticating the received
   signal includes storing a physical attribute of the received signal in association with data included in the received signal and a timer.

4. The method of claim 1, further comprising:
   executing a security policy in response to an authentication failure.

5. The method of claim 1, wherein the physically authenticating includes hypothesis testing including:
   calculating a hypothesis result using a test statistic function; and comparing the hypothesis result with a threshold.

6. The method of claim 5, wherein the hypothesis testing includes adaptively determining the threshold.

7. The method of claim 1, wherein the higher layer processing includes
   purely cryptographic validation.

8. The method of claim 1, wherein the receiving a signal includes
   receiving a plurality of signals from the WTRU wherein each signal includes an element of a one-way hash chain; and the higher layer processing includes determining whether a hash value of a first one-way hash chain element in a first signal in the plurality of signals matches a second one-way hash chain element in a second signal in the plurality of signals.

9. The method of claim 1, further comprising: performing secure wireless communication with the WTRU.

10. A wireless transmit/receive unit (WTRU) comprising: a receiver configured to receive a signal from a second WTRU; and a processor configured to authenticate the received signal by:
    checking for a valid predetermined CIR measurement and if the valid predetermined CIR measurement exists, physically authenticating the received signal, wherein the physically authenticating includes evaluating a channel impulse response (CIR) measurement of the received signal by comparing a shape of the CIR measurement with a shape of the valid predetermined CIR measurement, and
    if the shape of the CIR measurement matches the shape of the predetermined CIR measurement, higher layer processing the received signal.

11. The WTRU of claim 10, wherein the processor is configured to physically authenticate by:
    determining whether a predetermined physical attribute is available based on data included in the signal; and
    determining whether a physical attribute of the received signal matches the predetermined physical attribute, on a condition that the predetermined physical attribute is available.

12. The WTRU of claim 10, wherein the processor is configured to store a physical attribute of the received signal in association with data included in the received signal and a timer.

13. The WTRU of claim 10, wherein the processor is configured to execute a security policy in response to an authentication failure.

14. The WTRU of claim 10, wherein the processor is configured to
   physically authenticate by performing hypothesis testing including:
   calculating a hypothesis result using a test statistic function; and comparing the hypothesis result with a threshold.

15. The WTRU of claim 14, wherein the processor is configured to adaptively determine the threshold.

16. The WTRU of claim 10, wherein the processor is configured to perform higher layer processing by performing purely cryptographic validation.

17. The WTRU of claim 10, wherein the receiver is configured to receive a plurality of signals from the second WTRU wherein each signal includes an element of a one-way hash chain; and the processor is configured to perform
   higher layer processing by determining whether a hash value of a first one-way hash chain element in a first signal in the plurality of signals matches a second one-way hash chain element in a second signal in the plurality of signals.

18. The WTRU of claim 10, further comprising:
   a transmitter configured to perform secure wireless communication with the second WTRU.

19. A method for use in wireless communication, the method comprising:
   receiving a signal from a wireless transmit/receive unit (WTRU); and
   authenticating the received signal by:
   checking for a stored channel impulse response (CIR) reference data and using a timer to determine if the stored channel impulse response (CIR) reference data is valid, if no valid stored CIR reference data is found, evaluating the received signal using higher level authentication;
   if the signal is authenticated using the higher level authentication, storing an evaluated CIR measurement of the received signal as a new stored CIR reference data; and
   in another period of time, using the new stored CIR reference data to authenticate the WTRU.

* * * * *